(12) United States Patent
Bickham et al.

(10) Patent No.: US 10,133,001 B2
(45) Date of Patent: Nov. 20, 2018

(54) OPTICAL FIBER CABLES AND MODULES WITH MODAL DISPERSON COMPENSATION

(71) Applicant: CORNING OPTICAL COMMUNICATIONS LLC, Hickory, NC (US)

(72) Inventors: Scott Robertson Bickham, Corning, NY (US); Xin Chen, Corning, NY (US); John Douglas Coleman, Hickory, NC (US); Ming-Jun Li, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 65 days.

(21) Appl. No.: 15/165,174

(22) Filed: May 26, 2016

(65) Prior Publication Data
US 2016/0274304 A1 Sep. 22, 2016

Related U.S. Application Data

(63) Continuation of application No. PCT/US2014/064272, filed on Nov. 6, 2014.
(Continued)

(51) Int. Cl.
*H04B 10/12* (2006.01)
*G02B 6/26* (2006.01)
(Continued)

(52) U.S. Cl.
CPC ........... *G02B 6/268* (2013.01); *G02B 6/0288* (2013.01); *G02B 6/4246* (2013.01);
(Continued)

(58) Field of Classification Search
CPC .... G02B 6/268; G02B 6/0288; G02B 6/4246; H04B 10/2503; H04B 10/2507; H04B 10/2581; H04B 10/40
(Continued)

(56) References Cited

U.S. PATENT DOCUMENTS 6,363,195 B1 3/2002 Abbott, III et al.
7,139,457 B2 11/2006 Guan et al.
(Continued)

FOREIGN PATENT DOCUMENTS

JP 2006221052 A 8/2006
WO 2014011525 A2 1/2014

OTHER PUBLICATIONS

Patent Cooperation Treaty Invitation to Pay Additional Fees, Application No. PCT/US2014/064272, dated Jul. 22, 2015, 7 pages.
(Continued)

*Primary Examiner* — M. R. Sedighian
(74) *Attorney, Agent, or Firm* — Adam R. Weeks (57) ABSTRACT

An optical fiber cable for bi-directional communication of optical signals is disclosed. The optical fiber cable has a primary multimode optical fiber with an alpha value of α and is concatenated to a compensating fiber with an alpha value α, wherein $1.2 \leq (\alpha' - \alpha) \leq -0.1$. The optical fiber cable has a reach between 50 m and 800 m. Modules that employ a plurality of concatenated primary and compensating optical fibers are also disclosed. A bi-directional optical fiber communications system that operates at two different wavelengths is also disclosed.

14 Claims, 11 Drawing Sheets

Related U.S. Application Data (60) Provisional application No. 61/909,530, filed on Nov. 27, 2013.

(51) Int. Cl.

| | | |
|---|---|---|
| *G02B 6/42* | (2006.01) | |
| *G02B 6/028* | (2006.01) | |
| *H04B 10/2581* | (2013.01) | |
| *H04B 10/25* | (2013.01) | |
| *H04B 10/40* | (2013.01) | |
| *H04B 10/2507* | (2013.01) | |

(52) U.S. Cl.
CPC ..... *H04B 10/2503* (2013.01); *H04B 10/2507* (2013.01); *H04B 10/2581* (2013.01); *H04B 10/40* (2013.01)

(58) Field of Classification Search
USPC .......................... 398/140, 141, 142, 143, 144
See application file for complete search history.

(56) References Cited

U.S. PATENT DOCUMENTS

| | | |
|---|---|---|
| 8,406,952 B2 | 3/2013 | Nakayama |
| 8,977,091 B2 | 3/2015 | Chen et al. |
| 2006/0034573 A1 | 2/2006 | Guan et al. |
| 2010/0021170 A1 | 1/2010 | Lumineau et al. |
| 2012/0093518 A1* | 4/2012 | Tosetti ............. H04B 10/40 398/135 |
| 2012/0230638 A1 | 9/2012 | Bickham et al. |
| 2014/0086577 A1* | 3/2014 | Chen ............. G02B 6/268 398/29 |
| 2014/0099117 A1* | 4/2014 | Way ............. H04B 10/5167 398/79 |

OTHER PUBLICATIONS

Patent Cooperation Treaty International Search Report, Application No. PCT/US2014/064272, dated Nov. 5, 2015, 6 pages.

Ning Guan, et al., Multimode Fibers for Compensating Intermodal Dispersion of Graded-Index Multimode Fibers, Journal of Lightwave Technology, vol. 22, No. 7, Jul. 2004, 6 pages.

Multimode Fibre Bend-Insensitive 10, 40, 100 Gb/s Graded-Index Multimode Fibre MaxCap-BB-OM2/OM2+/OM3/OM4, Prysmian Group, Issue date: Mar. 2013, 2 pages.

Tony Irujo, OM4—The Next Generation of Multimode Fiber, OFS Optics, 2011, 4 pages.

Signature Core Fiber Optic Cabling System, www.panduit.com/datacenter, downloaded from Internet on Aug. 6, 2015, 6 pages.

Signature Core Fiber Optic Cabling System, Multimode Fiber: Understanding Chromatic Dispersion, Jun. 2012, 9 pages.

* cited by examiner

OPTICAL FIBER CABLES AND MODULES WITH MODAL DISPERSON COMPENSATION

PRIORITY APPLICATIONS

This application is a continuation of International Application No. PCT/US14/64272, filed Nov. 6, 2014, which claims the benefit of priority to U.S. Application No. 61/909,530, filed Nov. 27, 2013, both applications being incorporated herein by reference.

FIELD

The present disclosure relates to optical fiber cables, and in particular to optical fiber cables with modal dispersion compensation.

BACKGROUND

Optical fibers (sometimes referred to herein simply as "fibers") are used to transmit optical signals for a variety of different applications. Optical fibers, including multimode optical fibers, are frequently used for data transmission over distances ranging from a meter or less (e.g., between telecommunication devices in a telecommunications center) up to distances of many meters (e.g., as long as several hundred meters or more), such as associated with transmitting optical signals within a local-area network either within a building or between buildings.

Multimode fibers, by definition, are designed to support multiple guided modes at a given wavelength. The bandwidth of a multimode fiber is defined by the fiber's ability to carry the different optical (guided) modes with little or no temporal separation as they travel down the fiber. This requires that the group velocities of the different optical modes be as close to the same value as possible. That is to say, there should be minimal modal dispersion (i.e., the difference in the group velocity between the different guided modes should be minimized) at a design ("peak") wavelength $\lambda_p$.

Multimode fibers may be classified by the ISO 11801 standard as OM1, OM2, OM3 and OM4, based on the modal bandwidth of the multimode fiber. The OM4 fiber supports 150 meter links at 40 Gb/s and 100 Gb/s in accordance with IEEE 802.3ba guidance. The letters "OM" stand for optical multimode.

Recently, there has been interest in using optical signals of different wavelengths to perform bi-directional (BiDi) optical signal transmission over a multimode fiber (MM fiber) as a cost-effective way to increase the capacity of optical fiber links for data center applications. Unfortunately, the nature of present-day MM fibers limits the range of BiDi systems to about 100 m at the data rate of 20 Gb/s due to modal dispersion that arises by using optical signals of wavelengths that are substantially different from the peak wavelength $\lambda_p$. Yet, there would be great benefit to extending the reach of the BiDi cabling to beyond the 100 m limit, e.g., to up to 150 m or even beyond.

SUMMARY

An aspect of the disclosure is an optical fiber cable for bi-directional communication of optical signals. The cable includes: a primary multimode optical fiber having first and second ends separated by a length L1, an alpha parameter $\alpha$ of about 2.1 and a peak wavelength $\lambda_p$ in the range from 820 nm to 880 nm, and a first modal bandwidth $BW_{40}$ of 4 GHz·km or greater; a compensating multimode optical fiber having first and second ends separated by a length L2<L1 and that is optically coupled to the primary multimode optical fiber at the respective second ends, wherein the compensating multimode optical fiber has an alpha parameter $\alpha'<\alpha$, and wherein $-1.2 \leq (\alpha'-\alpha) \leq -0.1$; a first optical fiber connector operably arranged at the first end of the primary multimode optical fiber; a second optical fiber connector operably arranged at the first end of the compensating multimode optical fiber; and wherein the optical fiber cable has a reach 50 m<LR<800 m.

Another aspect of the disclosure is a bi-directional optical fiber communication system that uses the optical fiber cable as described above. The system includes: a first transceiver having a first port that is operably connected to the first optical fiber connector of the optical fiber cable; a second transceiver having a second port that is operably connected to the second optical fiber connector of the optical fiber cable; and wherein the first transceiver emits optical signals of a first wavelength $\lambda_A$ that travel to the second transceiver, and wherein the second transceiver emits optical signals of a second wavelength $\lambda_B \neq \lambda_A$ that travel to the first transceiver.

Another aspect of the disclosure is a compensation module for use with a primary optical fiber cable. The compensation module includes: a housing having first and second ends and an interior; at least one first connection port at the housing first end; at least one second connection port at the housing second end; and a plurality of compensating optical fibers of different length that optically connect the at least one first connection port to the at least one second connection port, wherein each compensating optical fiber provides a select amount of modal dispersion compensation.

Another aspect of the disclosure is bi-directional optical fiber communication system. The system includes: first and second transceivers having respective first and second ports, wherein the first transceiver emits first optical signals of a first wavelength $\lambda_A$ in the range 820 nm$\leq \lambda_A \leq$880 nm, and wherein the second transceiver emits second optical signals of a second wavelength $\lambda_B$ in the range from 880 nm$\leq \lambda_B \leq$1600 nm; an optical fiber cable having respective first and second ends optically connected to the first and second transceiver respectively, the optical fiber cable having a primary multimode optical fiber of length L1 concatenated with a compensating multimode optical fiber of length L2<L1; wherein the primary multimode optical fiber has an alpha parameter $\alpha$ of about 2.1 and a peak wavelength $\lambda_p$ in the range from 840 nm to 860 nm, and a first modal bandwidth $BW_{40}$ of 4 GHz·km or greater and wherein the compensating multimode optical fiber has an alpha parameter $\alpha'<\alpha$, and wherein $-0.9 \leq (\alpha'-\alpha) \leq -0.1$; and wherein the optical fiber cable has a reach LR=L1+L2, wherein 100 m<LR$\leq$150 m, and a modal bandwidth $BW_{40}$>2100 MHz·km for both $\lambda_A$ and $\lambda_B$, and wherein the primary optical fiber has a modal bandwidth $BW_1$<2100 MHz·km for at least one wavelength in the range 880 nm $\lambda_B \leq$1600 nm.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

The entire disclosure of any publication or patent document mentioned herein is incorporated by reference.

Definitions

The term "relative refractive index," as used herein, is defined as:

$$\Delta(r)=[n(r)^2-n_{REF}^2)]/2n_0^2,$$

where n(r) is the refractive index at radius r, unless otherwise specified. The relative refractive index is defined at 850 nm unless otherwise indicated, but could be defined at the system or operating wavelength, $\lambda_s$. In one aspect, the reference index $n_{REF}$ is silica glass. In another aspect, the system wavelength is 850 nm and $n_{REF}$ is 1.4525. In another aspect, $n_{REF}$ is the maximum refractive index of the cladding. $n_0$ is the maximum index of the index profile. In most cases, the $n_0$=n(0). As used herein, the relative refractive index is represented by $\Delta$ and its values are given in units of "%," unless otherwise specified. In cases where the refractive index of a region is less than the reference index $n_{REF}$, the relative refractive index is negative and is referred to as having a depressed region or depressed index, and the minimum relative refractive index is calculated at the point at which the relative index is most negative, unless otherwise specified. In cases where the refractive index of a region is greater than the reference index $n_{REF}$, the relative refractive index is positive and the region can be said to be raised or to have a positive index.

The alpha parameter $\alpha$ as used herein relates to the relative refractive index $\Delta$, which is in units of "%," where r is the radius (radial coordinate) of the fiber, and which is defined by:

$$\Delta(r) = \Delta_0\left[1 - \left(\frac{r - r_m}{r_0 - r_m}\right)^\alpha\right],$$

where $r_m$ is the point where $\Delta(r)$ is the maximum $\Delta_0$, $r_0$ is the point at which $\Delta(r)$ % is zero and r is in the range $r_i \leq r \leq r_f$, where $\Delta(r)$ is defined above, $r_i$ is the initial point of the $\alpha$-profile, $r_f$ is the final point of the $\alpha$-profile and $\alpha$ is an exponent that is a real number. For a step index profile, $\alpha > 10$, and for a gradient-index profile, $\alpha < 5$. It is noted here that different forms for the core radius $r_0$ and maximum relative refractive index $\Delta_0$ can be used without affecting the fundamental definition of $\Delta$. For a practical fiber, even when the target profile is an alpha profile, some level of deviation from the ideal situation can occur. Therefore, the alpha parameter $\alpha$ for a practical fiber is obtained from a best fit of the measured index profile. An alpha parameter $\alpha$=2.1 provides a minimum for the differential mode delay (DMD) at 850 nm=850 nm for a multimode fiber with $\Delta_0$=1% made by the outside vapor deposition (OVD) process. The alpha parameter for multimode fibers made other processes such as modified chemical vapor deposition (MCVD) and plasma chemical vapor deposition (PCVD) can be slightly different. The alpha parameter $\alpha$ as used below is for the primary fiber and the alpha parameter $\alpha'$ is used for the compensating fiber, with α>α'. The term Δα=α'-α represents the difference between the two alpha parameters.

The limits on any ranges cited herein are considered to be inclusive and thus to lie within the range, unless otherwise specified.

The numerical aperture or NA of an optical fiber means the numerical aperture as measured using the method set forth in IEC-60793-1-43 (TIA SP3-2839-URV2 FOTP-177) titled "Measurement Methods and Test Procedures: Numerical Aperture".

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ.

The term "mode" is short for a guided mode or optical mode. A multimode optical fiber means an optical fiber designed to support the fundamental guided mode and at least one higher-order guided mode over a substantial length of the optical fiber, such as 2 meters or longer.

The aforementioned peak wavelength $\lambda_p$ is the wavelength at which a particular optical fiber has the highest modal bandwidth BW. The system wavelength $\lambda_s$ is the wavelength at which the fiber is operating and is not necessarily the peak wavelength. For example a multimode fiber can have a peak wavelength $\lambda_p$=850 nm but the light traveling therein can have a system wavelength $\lambda_s$ of 852 nm. The peak wavelength for the primary fiber is denoted $\lambda_p$ while the peak wavelength of the compensating fiber is denoted $\lambda'_p$.

The overfilled bandwidth of an optical fiber is denoted BW and is defined herein as using overfilled launch conditions at 850 nm according to IEC 60793-1-41 (TIA-FOTP-204), Measurement Methods and Test Procedures: Bandwidth. The minimum calculated effective modal bandwidth EMBc can be obtained from the measured DMD spectrum as specified by IEC 60793-1-49 (TIA/EIA-455-220), Measurement Methods and Test Procedures: Differential Mode Delay. The units of bandwidth for an optical fiber can be expressed in MHz·km, GHz·km, etc., and a bandwidth expressed in these kinds of units is also referred to in the art as the bandwidth-distance product. The modal bandwidth is defined in part by modal dispersion. At the system level, the overall bandwidth can also be limited by chromatic dispersion, which limits the system performance at a high bit rate or for longer system reach.

The term bandwidth is denoted by B and has units of frequency, e.g., GHz.

The term "modal dispersion" or "intermodal dispersion" is, in an optical fiber, a measure of the difference in the travel times of the different modes of an optical fiber for light of a single wavelength and is primarily a function of the alpha profile of the optical fiber.

BiDi Optical Communication System

Figure 1A:
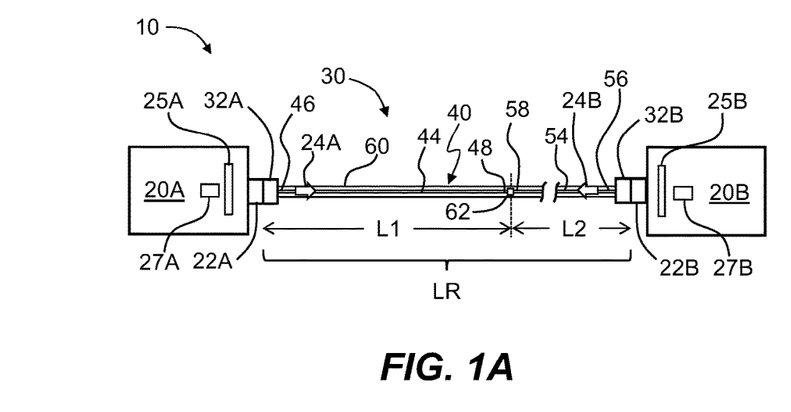
FIGS. 1A and 1B are schematic diagrams of two examples of a bi-directional optical communication system according to the disclosure.
Figure 1B:
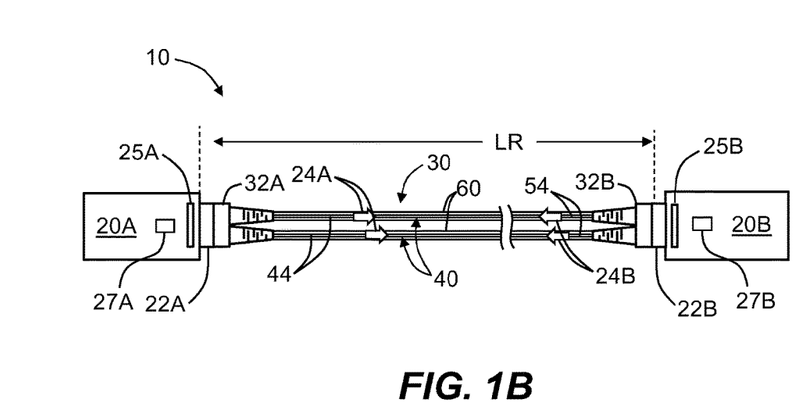

FIGS. 1A and 1B are schematic diagrams of two examples of a bi-directional optical communication system ("BiDi system") 10 according to the disclosure. The BiDi system 10 includes two BiDi transceivers 20A and 20B with respective ports 22A and 22B. Transceivers 20A and 20B are optically connected by an optical fiber cable 30 that has end connectors 32A and 32B that are connected to respective transceiver ports 22A and 22B. Transceivers 20A and 20B respectively emit optical signals 24A and 24B that have respective wavelengths $\lambda_A$ and $\lambda_B$. In an example embodiment, 820 nm≤$\lambda_A$≤880 nm and 880 nm≤$\lambda_B$≤1600 nm. In other example embodiments, 880 nm≤$\lambda_B$≤1360 nm or 880 nm≤$\lambda_B$≤1100 nm or 880 nm≤$\lambda_B$≤1000 nm.

In the example BiDi system 10 of FIG. 1A, optical fiber cable 30 includes a single optical fiber link 40 of length LR that includes a first or primary multimode optical fiber section ("primary fiber") 44 of length L1 and having first and second ends 46 and 48. An example primary fiber 44 has an alpha parameter α of about 2.1, a peak wavelength $\lambda_p$ in the range from 840 nm to 860 nm, and a modal bandwidth BW1≥4.7 GHz·km. An example multimode fiber with these properties is called OM4 multimode fiber.

Primary fiber 44 is operably connected at its first end 46 to transceiver 20A and at its second end 48 to a second or compensating multimode optical fiber section ("compensating fiber") 54 of length L2, which is described in greater detail below. Compensating fiber 54 has an end 56 operably connected to transceiver 20B and an end 58 operably connected to end 48 of primary fiber 40. Thus, optical fiber link 40 comprises concatenated primary and compensating fibers 44 and 54. In an example, the primary and compensating optical fibers 44 and 54 are encased in a jacket 60. Thus, an exemplary optical fiber cable 30 includes optical fiber link 40 formed by primary and compensating fibers 44 and 54, jacket 60, and end connectors 32A and 32B at respective ends of the optical fiber link, wherein the end connectors are configured to operably connect with a mating connector or with a device port.

In an example, a connector 62 is used to optically connect primary and compensating optical fibers 44 and 54 at their respective ends 48 and 58. The primary and compensating optical fibers 44 and 54 can also be spliced together at their respective ends 48 and 58 using known optical fiber splicing techniques. In an example, primary fiber 44 is an OM4 MM fiber, which is specified at 850 nm (i.e., has a peak wavelength) $\lambda_p$ of about 850 nm) and that has an alpha parameter α of about 2.1. The modal bandwidth of primary fiber 44 is denoted $BW_1$, the modal bandwidth of compensating fiber 54 is denoted $BW_2$, and the modal bandwidth of optical fiber link 40 is denoted $BW_{40}$, which defines the modal bandwidth of BiDi system 10. In the discussion below, the peak wavelength $\lambda_p$ refers to primary fiber 44 unless otherwise indicated.

The example BiDi system 10 of FIG. 1B shows optical fiber cable 30 as having two optical fiber links 40. An example of such an optical fiber cable 30 is an LC duplex cable. For such a dual-link optical fiber cable 30, transceivers 20A and 20B transmit and receive over each optical fiber link 40 (e.g., 20 GbE or 50 GbE over each optical fiber link, for a total of 40 GbE or 100 GbE in each direction). In general, optical fiber cable 30 can comprise one or more optical fiber links 40, with suitable end connectors 32A and 32B (e.g., LC duplex connectors or MPO connectors).

In an example, transceivers 20A and 20B are quad small-form-factor pluggable (QSFP+) transceivers that respectively include vertical-cavity surface-emitting laser (VCSEL) light sources 27A and 27B. The BiDi system 10 has a reach, i.e., the aforementioned length LR=L1+L2 between transceivers 20A and 20B. In an example, 1 m<LR≤800 m, and further in an example is 1 m<LR≤150 m, and further in an example is LR is nominally 150 m.

As noted above, transceivers 20A and 20B of BiDi system 10 transmit optical signals 24A and 24B over each optical fiber link 40 in opposite directions but at different wavelengths $\lambda_A$ and $\lambda_B$, e.g., $\lambda_A$=850 nm and $\lambda_B$=900 nm. The different wavelengths serve to reduce reflections at the opposite transceiver. Further, in an example, transceivers 20A and 20B have respective wavelength filters 25A and 25B that allow for transmission of their respective wavelengths $\lambda_A$ or $\lambda_B$ while blocking the other wavelength.

In an example, the modal bandwidth $BW_{40}$ of optical fiber link 40 is in the range from 2500 MHz·km to 2800 MHz·km at nominally=850 nm. The modal bandwidth of the primary fiber varies as a function of wavelength λ, and in particular gets smaller with increasing wavelength. A long-wavelength VCSEL light source 27 can have a center wavelength of 900 nm with a range of +/−18 nm for the entire wavelength distribution (spectrum). Therefore, as a worst case, the bandwidth $BW_{40}$ of optical fiber link 40 needs to satisfy the minimum bandwidth requirement at λ=918 nm. In an example based on industry needs, the modal bandwidth $BW_{40}$ for a reach LR=150 m at 900 nm+/−10 nm needs to be between 2100 MHz·km and 2500 MHz·km.

Figure 2:
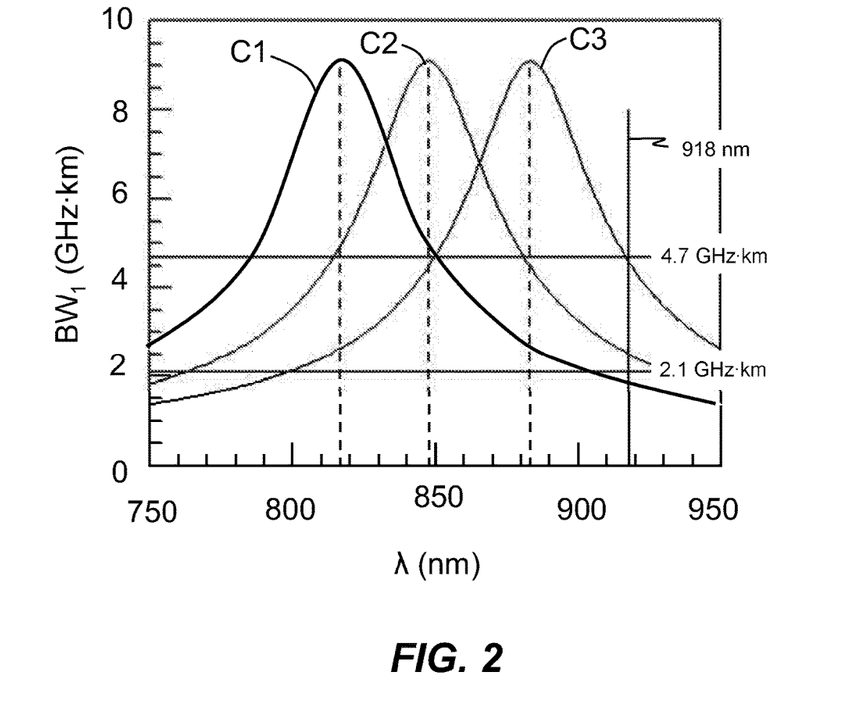
FIG. 2 is a plot of the modal bandwidth $BW_1$ (GHz·km) versus wavelength $\lambda$ (nm) showing three different curves (C1, C2 and C3) obtained based on measurements taken from an example OM4 MM fiber, and illustrating how not all OM4 MM fibers can satisfy a modal bandwidth requirement of 2.1 GHz·km at 918 nm.

While OM4 MM fibers are desirable for use in BiDi systems, not all OM4 MM fibers can meet the modal bandwidth requirement of $BW_{40}$=2100 MHz·km for a reach LR=150 m at the wavelength within the range from 882 nm to 918 nm. FIG. 2 is a plot of the modal bandwidth $BW_1$ (GHz·km) versus wavelength λ (nm) showing three different curves (C1, C2 and C3) obtained based on measurements taken from example OM4 MM fibers. The OM4 modal bandwidth threshold of 4.7 GHz·km is shown, along with the 2.1 GHz·km threshold. The vertical dashed lines correspond to the maximum of the respective curves and thus the respective peak wavelengths on the horizontal wavelength axis.

The modal bandwidth measurements were made using a ModCon mode controller (available from Arden Photonics Ltd., West Midlands, United Kingdom) to regulate the launch condition, which provides a typical VCSEL launch condition but with coverage over most of the radial region. The fitting function used for the modal bandwidth curves had the following form:

$$BW = \frac{0.2}{\sqrt{a^2 + c^2(\lambda - \lambda_p)^2}}$$

where a and c are curve-fitting parameters. Note that $\lambda=\lambda_p$ corresponds to the maximum modal bandwidth value.

The information from FIG. 2 can be used to analyze the capability of OM4 MM fibers at 918 nm because the OM4 MM fibers with highest peak modal bandwidth $BW_1$ and lowest peak wavelength $\lambda_p$ (Curve C1) sets the lower bound on the modal bandwidth $BW_1$ for OM4 fiber at 918 nm. As curves C1, C2 and C3 have the same basic form, the curves can be shifted to the left-most peak wavelength $\lambda_p$ and to the right most peak wavelength $\lambda_p$ while keeping the modal bandwidth $BW_1$ at λ=850 nm above 4700 MHz·km.

The range on the peak wavelength $\lambda_p$ can vary from about 820 nm to about 880 nm, and in an example ranges from 840 nm to 860 nm. The 820 nm to 880 nm range should be very close to the actual wavelength range for the peak wavelength of OM4 MM fiber for the whole distribution. An OM4 MM fiber with a peak modal bandwidth near 820 nm can result in bandwidth $BW_1$ at 918 nm lower than 2.1 GHz·km requirement. But, for OM4 MM fibers with sufficiently high peak wavelength $\lambda_p$, such as those above 850 nm, the modal bandwidth $BW_1$ at 918 nm is above 2.1 GHz·km.

Figure 3:
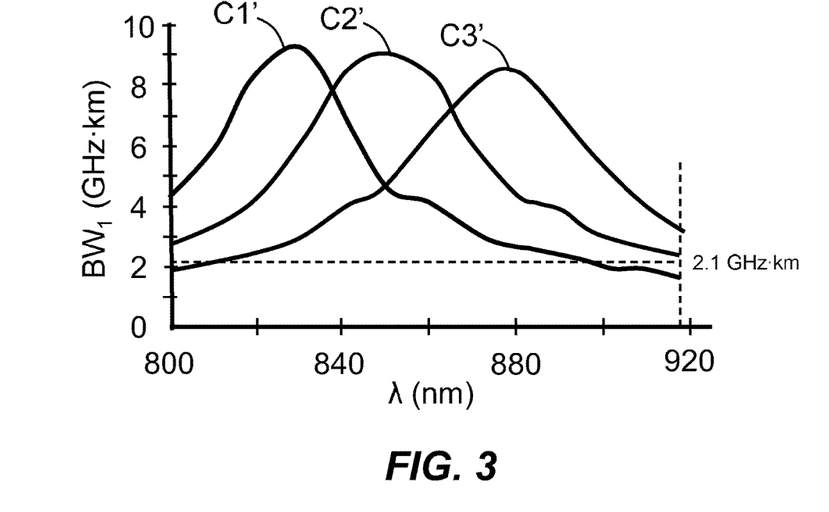
FIG. 3 is similar to FIG. 2 except that the data presented is based on modeling rather than actual measurements, with the plot showing three members of a distribution of one-thousand OM4 MM fibers.

The above analysis is supported by numerical modeling of OM4 MM fibers. FIG. 3 is a plot similar to FIG. 2 but is based on modeled modal bandwidth $BW_1$ versus wavelength λ for three members of a modeled distribution of one-thousand MM fibers. The modeling used variations in the alpha parameter to generate OM4 MM fibers with a range of peak wavelengths $\lambda_p$. Only those members of the distribution meeting the OM4 MM fiber bandwidth $BW_1$ at 850 nm are shown. The modal bandwidth $BW_1$ was calculated based on an overfill launch condition.

The curves C1' C2' and C3' of FIG. 3 are consistent with the curves C1, C2 and C3 of FIG. 2. In particular, the modeled modal bandwidth of the OM4 MM fibers of FIG. 3 show that OM4 MM fibers with peak modal bandwidths $BW_1$ at a peak wavelength $\lambda_p$ lower than about 840 nm will not be able to exceed 2.1 GHz·km at λ=918 nm.

Consequently, optical fiber link 40 is compensated for modal dispersion by employing compensating fiber 54 so that any OM4 MM fiber can be used as primary fiber 44, thereby enabling the optical fiber link can have a reach LR in excess of 100 m, e.g., 150 m.

Figure 4:
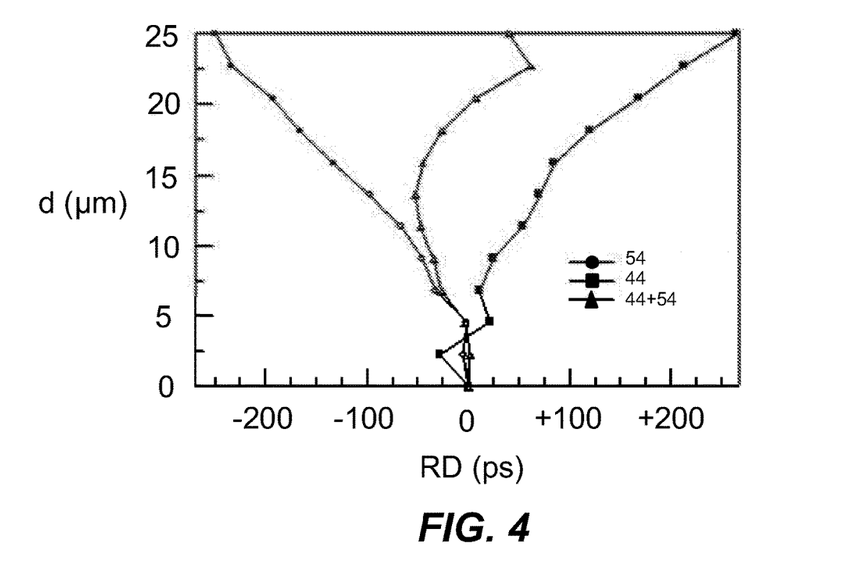
FIG. 4 is a plot of the coupling offset d (μm) versus the relative delay RD (picoseconds or ps) and shows the measured differential mode delay (DMD) for a) an OM4 MM fiber primary fiber of length L1=547 m and $\lambda_p$=850 (square data points); b) a low-alpha compensating fiber of length L2=230 m (circle data points), and c) an optical fiber link formed by combining the example primary and compensating fibers (triangle data points), wherein all of the DMD measurements were taken at $\lambda$=1060 nm.

To illustrate modal dispersion compensation effect using a compensation fiber, FIG. 4 is a plot of the coupling offset d (μm) versus relative delay RD (picoseconds or ps) and shows the measured DMD for a) an example OM4 MM fiber primary fiber 44 of length L1=547 m and peak wavelength $\lambda_p$=850 nm (square data points), b) for a low-alpha compensating fiber of length L2=230 m (circle data points), and c) the optical fiber link 40 formed by combining the example primary and compensating fibers (triangle points). All of the DMD measurements of FIG. 4 where taken at λ=1060 nm. The DMD centroid for the OM4 MM fiber primary fiber 44 is straight within 100 ps over a 1 km length at $\lambda_p$=850 nm, but at λ=1060 nm it is right-tilted due to material dispersion. On the other hand, the low-alpha compensating fiber 54 has a left-tilted DMD centroid at λ=1060 nm. Thus, the DMD curve for the optical link 40 that combines the primary and compensating fibers 44 and 54 is largely centered about RD=0 ps. In this example, the peak wavelength of the total link is moved from 850 nm of the primary fiber to 1060 nm. By changing the alpha value and the length of the compensation fiber, the peak wavelength of the total link can be moved to any desired wavelength, for example, 850 nm, 870 nm, 890 nm or 910 nm.

Optical fiber link 40 needs to have a certain degree of modal dispersion compensation to achieve the desired reach LR for the given optical signals 40A and 40B of wavelengths $\lambda_A$ and $\lambda_B$, e.g., for $\lambda_A$=850 nm and $\lambda_B$=918 nm. Note that at $\lambda_A$=850 nm, the required modal bandwidth $BW_{40}$ for a reach of LR=150 m is in the range 2500 2800 MHz·km and at $\lambda_B$=918 nm, the modal bandwidth $BW_{40}$ needs to be in the range 2100-2500 MHz·km.

Based on the information in FIGS. 2 and 3, the peak wavelength $\lambda_p$ for the OM4 MM fiber 44 needs to be shifted upwards by 15 nm to 30 nm to boost the 918 nm modal bandwidth $BW_{40}$ above the 2.1 GHz·km threshold, while keeping the 850 nm bandwidth $BW_{40}$ above the 2500 MHz·km threshold. For example, if curve C1 of FIG. 2 is shifted to the right by 25 nm, then the bandwidth $BW_{40}$ will be above 2.1 GHz·km, and perhaps even above 2.5 GHz·km. On the other hand, the 850 nm modal bandwidth $BW_{40}$ would go up farther from the OM4 MM fiber threshold level of 4.7 GHz·km, which is better.

The impact of moving curves C2 and C3 to the right by 25 nm is different. In particular, for curve C3, the 918 nm modal bandwidth $BW_{40}$ is far more than needed while the 850 nm bandwidth $BW_{40}$ decreases, but still has a value around 2700 MHz·km and is within the range of the modal bandwidth $BW_{40}$ needed. To optimize the performance of BiDi system 10, optical link 40 can employ different lengths L2 of compensating optical fiber 54 for different OM4 MM fiber s primary fibers 44 such as represented by curves C1, C2 and C3 of FIG. 2. A similar analysis can be done using modeling-based results, such as presented in FIG. 3.

From the above analysis, in one example embodiment the goal of the modal dispersion compensation in BiDi system 10 is to shift the peak wavelength $\lambda_p$ of the primary fiber 44 up by 20 nm to 30 nm, e.g., by about 25 nm. Said differently, the goal is to form an optical fiber link 40 wherein the peak wavelength $\lambda_{p40}$ of the link is shifted up by 20 nm to 30 nm relative to the peak wavelength $\lambda_p$ of primary fiber 44.

By way of example, the wavelength dependence of the modal dispersion of an example OM4 MM fiber primary fiber 44 with $\lambda_p=850$ nm is considered. The modal delay change $\Delta C$ (in unit of ns/km) with radius r of the DMD centroid can be described by the equation $\Delta C(r)=[\Delta\lambda/D]\cdot(r/a)^2$, where r is a radial coordinate of the OM4 MM fiber 44, $\Delta\lambda$ is the change (in nm) of wavelength from 850 nm, and a is the core radius. Over a wavelength range of 30 nm to 40 nm around 850 nm, D is a coefficient with the value of about 300 (nm·km/ns). The equation for $\Delta C$ was obtained by modeling the DMD behavior of 1 km of OM4 MM fiber having an alpha refractive index profile at wavelengths around 850 nm, and fitting the centroid difference in the wavelength regime.

Figure 5:
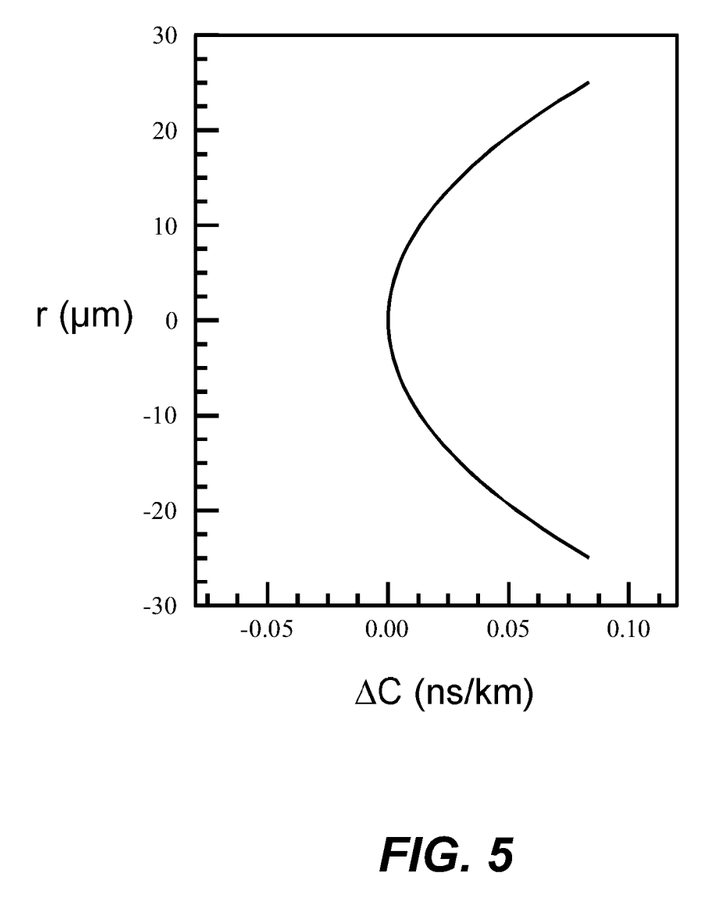
FIG. 5 is a plot of the fiber radius r (μm) versus the modal delay change $\Delta C$ (ns/km) over a 25 nm wavelength change for the example 1 km OM4 MM fiber primary fiber.

FIG. 5 is a plot of the fiber radius r (μm) versus the modal delay change $\Delta C$ (ns/km) and shows the amount of modal delay change over a 25 nm wavelength change for the example 1 km OM4 MM fiber primary fiber 44. The amount of modal delay needed at a given wavelength (say 850 nm) to shift the peak wavelength $\lambda_p$ by 25 nm would be $-\Delta C$. For 150 m of OM4 MM fiber, to shift the peak wavelength $\lambda_p$ up by 25 nm, the modal delay change needed is $\Delta C=(83/1000)\cdot 150=12.5$ ps at r=25 μm.

Figure 6:
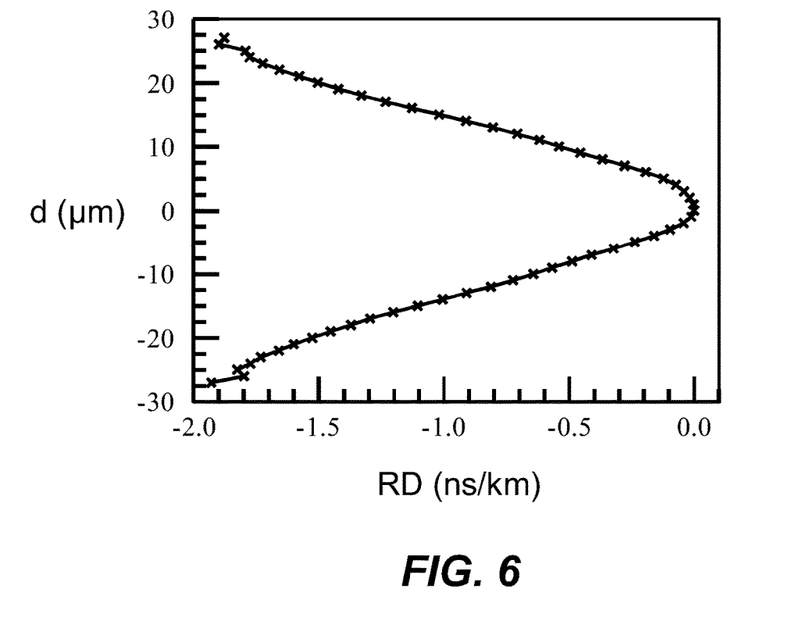
FIG. 6 and FIG. 7 are plots of the coupling offset d (μm) versus the relative delay RD (ns/km) that show the centroid delays for two different low-alpha compensating fibers that have targeted alpha values of $\alpha$=1.85 and 1.55, respectively.
Figure 7:
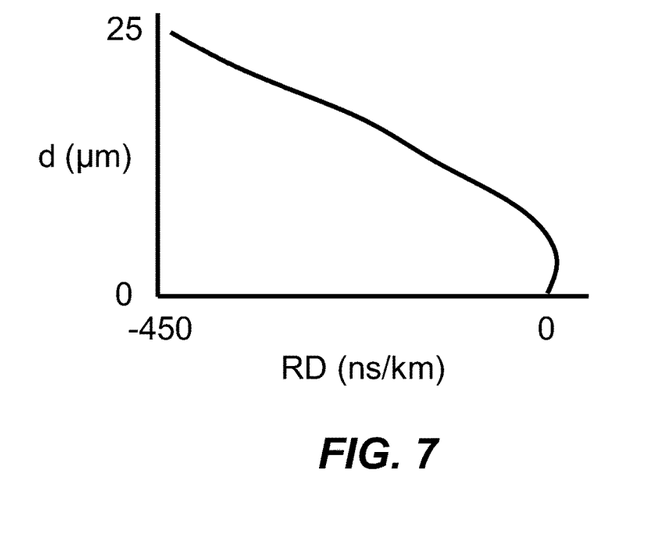
Figure 8:
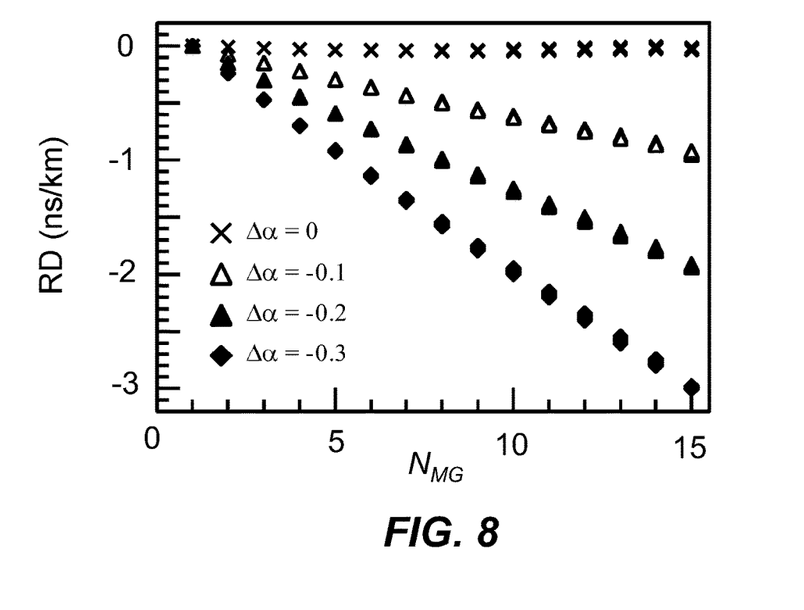
FIG. 8 plots of relative delay (ns/km) vs. mode group number $N_{MG}$ for different values of $\Delta\alpha$.

FIG. 6 and FIG. 7 are plots of the coupling offset d (μm) versus the relative delay RD (ns/km) that show the centroid delays for two different low-alpha compensating fibers 54 with targeted alpha values of $\alpha'=1.85$ and 1.55, respectively. These are referred to as "low alpha" fibers because the values of the alpha parameter $\alpha'$ are smaller than the value of $\alpha=2.1$ that is known to minimize DMD at 850 nm. The two example low-alpha compensating fibers 54 have a delay (per meter) of 1.8 ps and 4.3 ps, respectively. This means that to shift the peak wavelength $\lambda_p$ of 150 m of OM4 MM fiber up by 12.5 ps, the compensating fiber with $\alpha'=1.85$ alpha needs to have a length of L2=7 m, or for $\alpha'=1.55$ needs to have a length L2=2.9 m. It is feasible to make compensating fibers 54 with even smaller alpha parameters $\alpha'$ because the delay scales with the $\Delta\alpha$. This scaling is shown in FIG. 8, which plots of relative delay (ns/km) vs. mode group number $N_{MG}$ for different values of $\Delta\alpha$. In an example, $-1.2\leq\Delta\alpha\leq0.1$. Also in an example, compensating fiber has a peak wavelength $\lambda'_p>880$ nm, a modal bandwidth $BW_2<500$ MHz·km, and a maximum relative refractive index $\Delta_0$, wherein $0.7\%\leq\Delta_0\leq3.0\%$ or in another embodiment to be $0.8\%\leq\Delta_0\leq1.5\%$ or in another embodiment $0.9\%\leq\Delta_0<1.2\%$.

In an example, compensation fiber 54 can be a MM fiber optimized for operation at relatively long wavelengths, e.g., 1300 nm. In such a case, the length L2 of compensating fiber 54 may be longer than a compensating fiber optimized at a shorter wavelength. Such a long-wavelength compensating fiber 54 may represent a substantial portion of optical fiber link 40 and thus may not be suitable for use as jumpers. In this case, the compensation fiber can be part of the total cable link.

Figure 9:
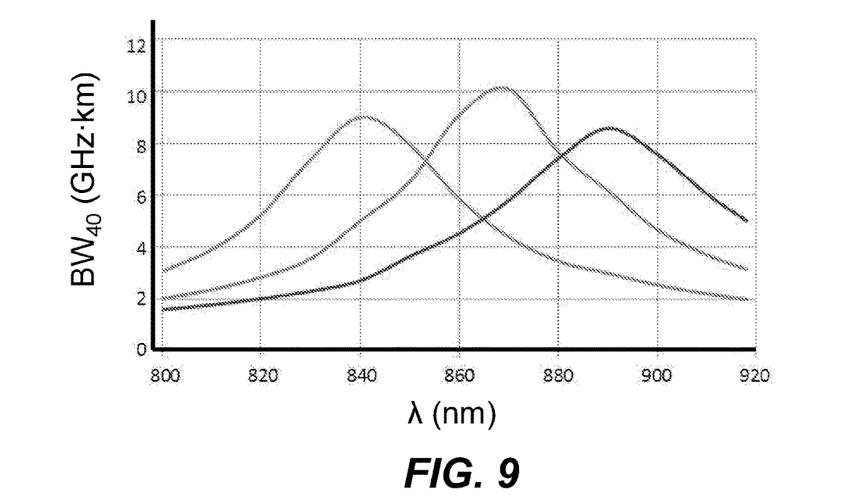
FIG. 9 is similar to FIG. 3 and plots the modeled bandwidths $BW_{40}$ for an example optical fiber link formed from the 100 m of the OM4 MM fiber of FIG. 3 and 5 m of compensating fiber optimized for 1300 nm.

FIG. 9 is similar to FIG. 3 and plots the modeled bandwidths $BW_{40}$ for an example optical fiber link 40 formed from 100 m of OM4 MM fiber 44 of FIG. 3 and 5 m of compensating fiber 54 optimized for 1300 nm. Adding the compensating fiber 54 serves to shift the curves of FIG. 9 to longer wavelengths by about 15 nm. However, this is not quite enough to guarantee that the worst case OM4 MM fiber will allow optical fiber link 40 to meet the bandwidth requirement for $BW_{40}$ at 918 nm for reach LR. Thus, the length L2 of the compensating fiber 54 should be increased, e.g., to be in the range from 7 m to 10 m.

Experimental Results

Experiments were performed to validate the effectiveness of the modal dispersion compensation of optical fiber link 40 and optical fiber cable 30. Three example primary fibers 44 with $\lambda_p$ less than 830 nm were used to illustrate the modal dispersion compensation. The fiber length L1 for each example fiber 44 was essentially 1 km (i.e., 999.5 m).

The bandwidths $BW_1$ of the example primary fibers 44 at various wavelengths around 850 nm and at 914 nm were measured using a ModCon mode conditioner. Because of the relatively low peak wavelength $\lambda_p$, the bandwidth $BW_1$ of each of the three example primary fibers 44 as measured at 918 nm were around or below the threshold modal bandwidth of 2100 MHz·km needed for 20 GHz transmission over a reach of LR=150 m.

Further in the experiments, an example compensating fiber 54 of length L2=20 m and $\alpha'=1.55$ was fabricated. The example primary fibers 44 were then connected to the example compensating fiber 54 to form three corresponding example optical fiber links 40. Table 1 below sets for the various parameters for the example primary fibers 44 (denoted EX1, EX2 and EX3), and the corresponding optical fiber links 40.

TABLE 1

| PRIMARY FIBER | L1 (m) | $\lambda_p$ (nm) | $BW_1$ @ 850 nm (GHz · km) | $BW_1$ @ 914 nm (GHz · km) | $BW_{40}$ @ 850 nm (GHz) | $BW_{40}$ @ 914 nm (GHz) |
|---|---|---|---|---|---|---|
| EX1 | 999.5 | 827 | 5.35 | 2.12 | 6.94 | 3.7 |
| EX2 | 999.5 | 828 | 4.07 | 2.13 | 4.42 | 2.97 |
| EX3 | 999.5 | 806 | 3.63 | 1.8 | 5.27 | 2.85 |

The bandwidth $BW_{40}$ of the three example optical fiber links 40 was increased to above 2.8 GHz·km (relative to bandwidth $BW_1$ of primary fiber 44), which is more than enough to meet the bandwidth requirement for a reach of LR=150 m. The bandwidth $BW_{40}$ at 850 nm also increased as $\lambda_p$ increased.

Figure 10A:
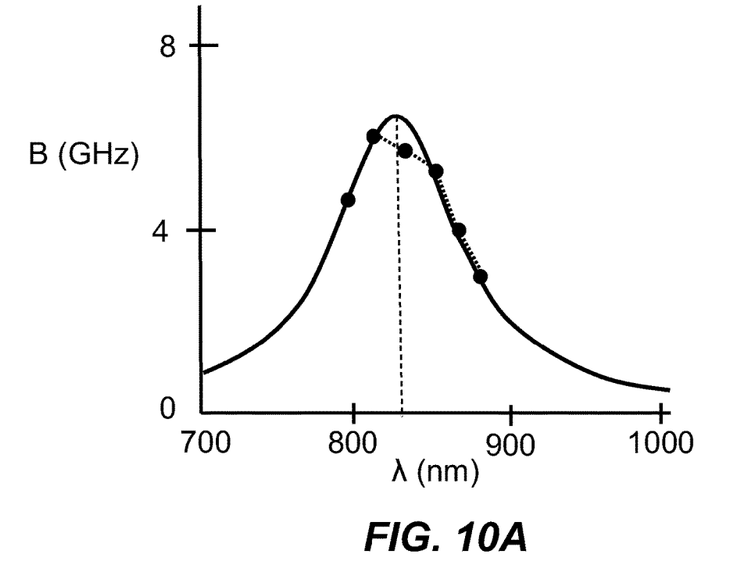
FIGS. 10A and 10B are plots of bandwidth B (GHz) versus wavelength $\lambda$ (nm) for 1 km of the primary fiber of example EX1 (see Table 1) concatenated with 20 m of a low-alpha compensating fiber.
Figure 10B:
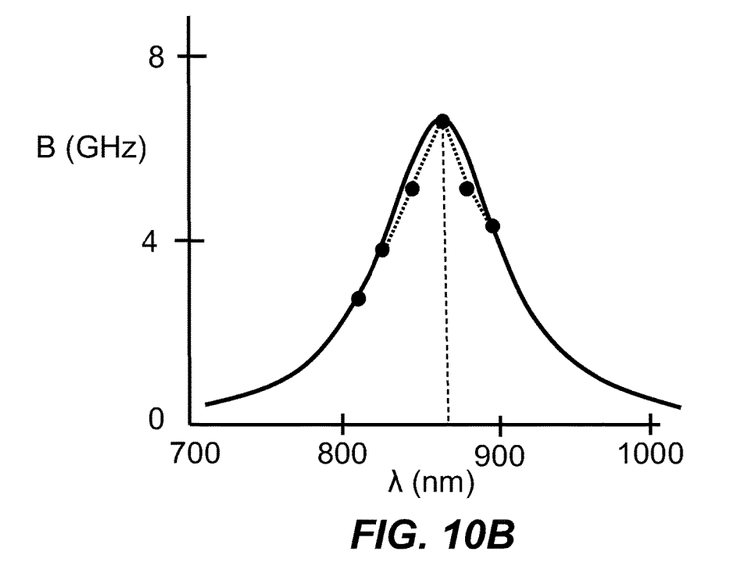

FIGS. 10A and 10B are plots of bandwidth B (GHz) versus wavelength λ (nm). FIG. 10A is for the example EX1 primary fiber 44, while FIG. 10B is for the optical fiber link 40 formed from example EX1 primary fiber 44 and the 20 m low-alpha compensating fiber 54. The solid-line curves represent a best-fit to the data. Note that for a 150 m BiDi application, one only needs L2=3 m of compensating fiber 54. The plots of FIGS. 10A and 10B show a shift in $\lambda_p$ of about 25 nm.

Figure 11:
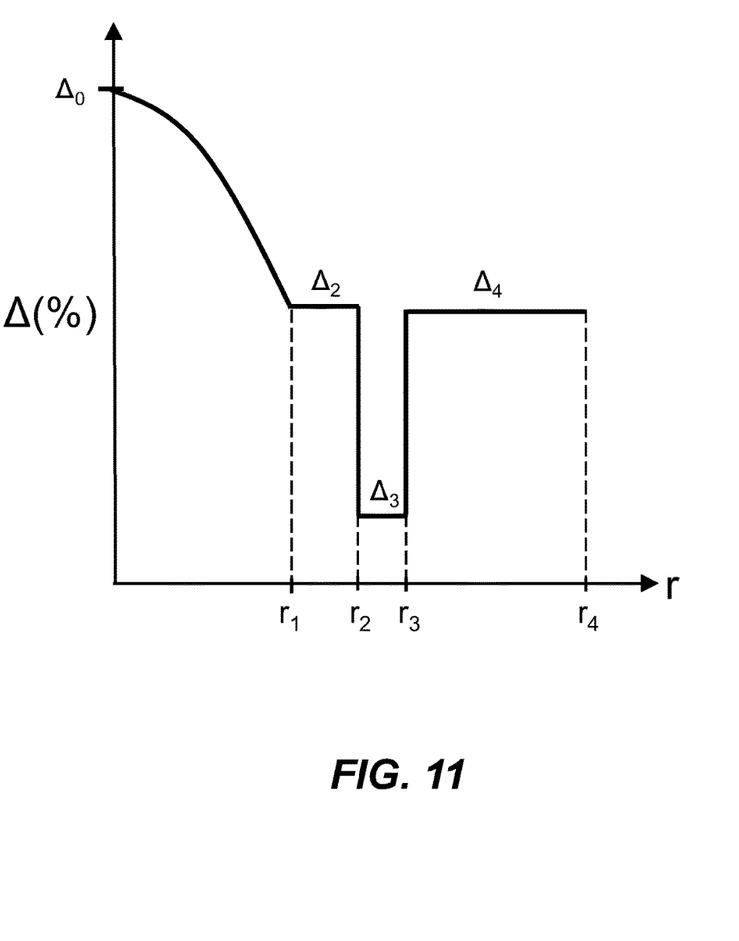
FIG. 11 is a plot of the relative refractive index $\Delta$(%) versus radius r for an example bend-insensitive primary optical fiber.

In an example, primary fiber 44 is bend insensitive, e.g., its refractive index profile $\Delta(\%)$ has a low index trench structure in the cladding as a function of fiber radius r such as shown in FIG. 11, so that optical fiber link 40 can be deployed in more challenging environments or compact spaces. In an example, embodiment, compensating fiber 54 is also bends insensitive. The example refractive index profile $\Delta(\%)$ includes regions with $\Delta_2$, $\Delta_3$ and $\Delta_4$, wherein the region associated with $\Delta_3$ between radii $r_2$ and $r_3$ is a trench region wherein $\Delta_3<\Delta_2$, $\Delta_4$. Examples of bend-insensitive optical fibers are disclosed in U.S. Patent Application Publication No. 2012/0230638 and in U.S. Pat. No. 8,406,952.

In example embodiments, optical fiber link 40 (and thus optical fiber cable 30) has a modal bandwidth $BW_{40}>5$ GHz·km or $BW_{40}>7$ GHz·km in the wavelength range from 880 nm to 1600 nm. Also in example embodiments, optical fiber link 40 and optical fiber cable 30 support the transmission of optical signals 24A and 24B at a data rate of 10 Gb/s or greater, or at a data rate of 16 Gb/s or greater, or at a data rate of 25 Gb/s or greater.

Figure 12A:
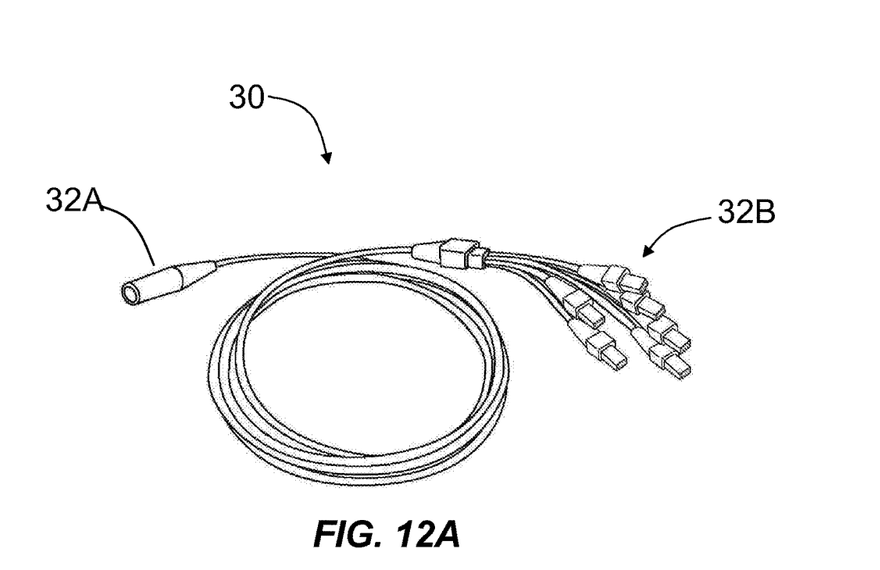
FIG. 12A illustrates an example embodiment of the optical fiber cable in the form of an LC jumper cable having LC connectors.
Figure 12B:
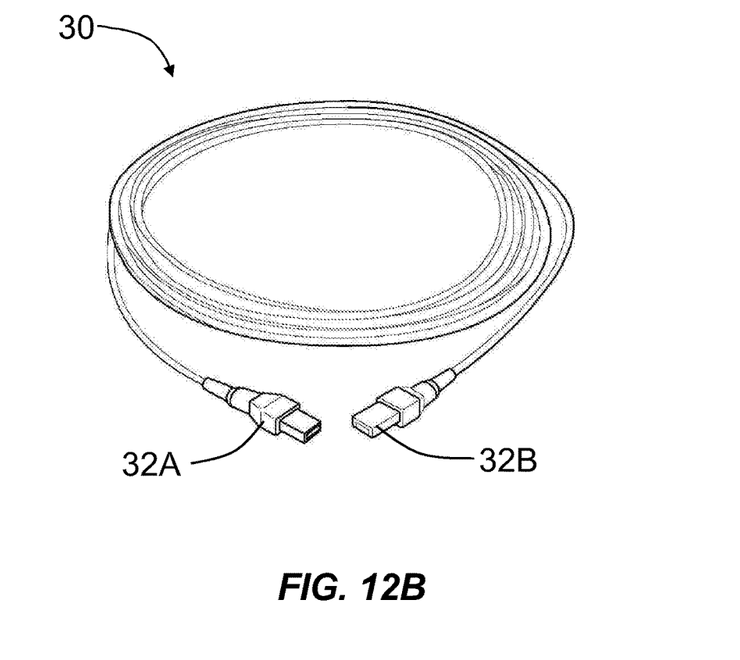
FIG. 12B illustrates an example embodiment of the optical fiber cable in the form of an MPO-to-LC harness or fan-out cable with multiple LC connectors.

Optical fiber cable 30 can have a variety of different forms. FIG. 12A illustrates an example embodiment where optical fiber cable 30 is in the form of an LC jumper cable having LC connectors 32A and 32B. FIG. 12B illustrates an example embodiment wherein optical fiber cable 30 is in the form of an MPO to LC harness or fan-out cable with multiple LC connectors 32B.

Figure 13A:
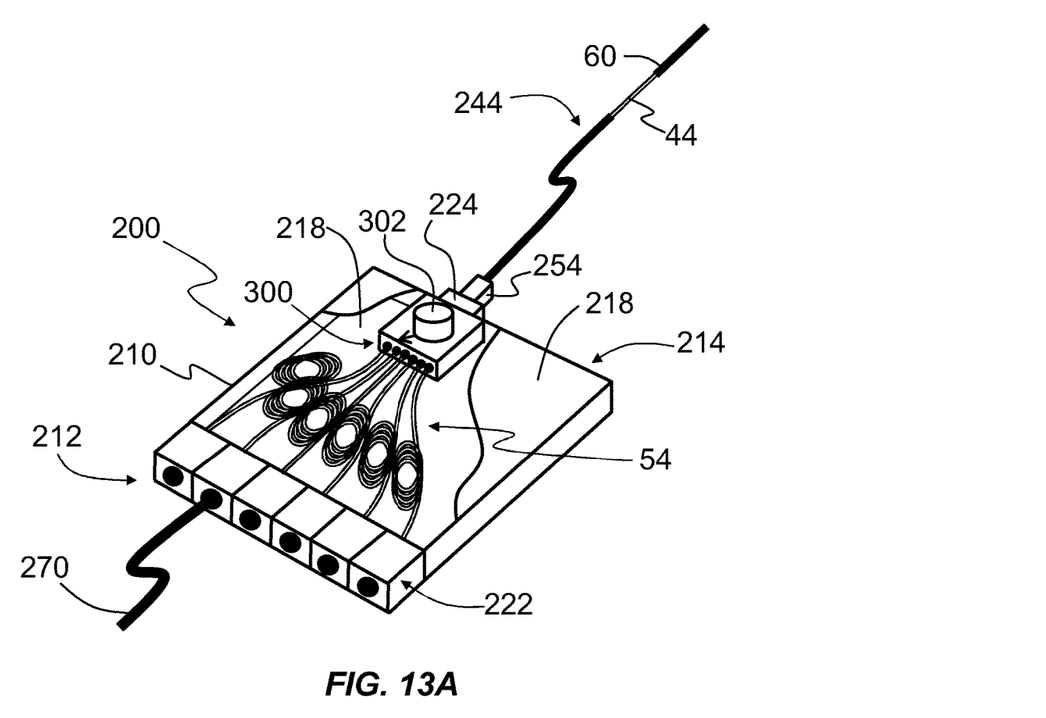
FIG. 13A through FIG. 13C are elevated (FIG. 13A) and top-down partial cut-away views (FIGS. 13B, 13C) that illustrate examples of a compensation module that includes different lengths of compensating fiber and that allow for selecting a required amount of modal dispersion compensation.

FIG. 13A is an elevated view of an example compensation module 200 that can be used to form optical fiber links 40 where the amount of modal dispersion compensation can be selected. Compensation module 200 has a housing 210 with a front end 212, a back end 214, a top 216 and an interior 218. Front end 212 includes a plurality of first connector ports 222 while back end 214 includes a single second connector port 224. Six first connector ports 222 are shown by way of example. In other examples, anywhere from two to twenty-four first connector ports 222 can be used. The actual number of first connector ports 222 employed can be larger than twenty four, and is only limited by the physical size of compensation module 200. In an example, successively numbers first connection ports 222 correspond to successively longer compensating optical fibers 54.

A primary optical fiber cable 244 that includes a length L1 of primary fiber 44 and that is terminated by an optical fiber connector 254 is optically connected to a second connector port 224 via optical fiber connector 254. In an example, an optical fiber cable 270 (e.g., a jumper) is optically connected to one of first connection ports 222. An optical switch 300 optically connects second connector port 224 to a plurality of compensating fibers 54 each having different lengths L2. In another embodiment, the optical switch 300 optically connects second connector port 224 to a plurality of compensating fibers 54 each having same length L2, but with difference alpha values. Optical switch 300 includes a dial 302 or like device for selecting an optical connection between second connector port 224 and a given first connector port 222. Thus, each first connector port 222 corresponds to a different amount of modal dispersion compensation. This allows a user to select a particular first connector port 222 to form an optical connection based on the particular application and the needs in the field.

Figure 13B:
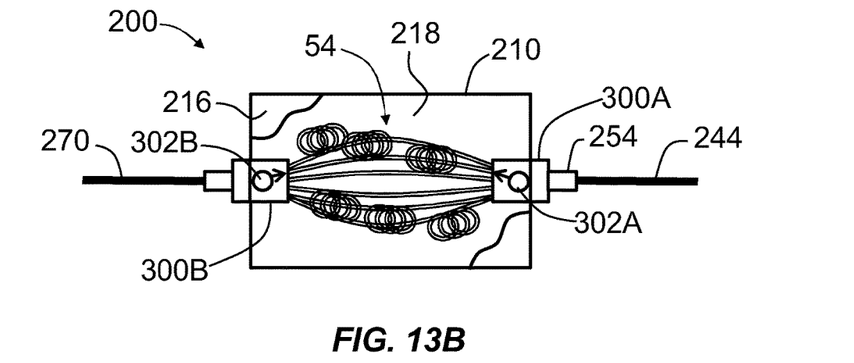

FIG. 13B is a top-down view of another example of compensation module 200 that includes two optical switches 300A and 300B with respective dials 302A and 302B. The use of two optical switches 300A and 300B allows the compensation module 200 to have a single first connector port 222. The user can use dials 302A and 302B to select the appropriate compensating fiber 54 having the length L2 that provides the required amount of mode dispersion compensation when connecting, for example, to optical fiber cable 270.

Figure 13C:
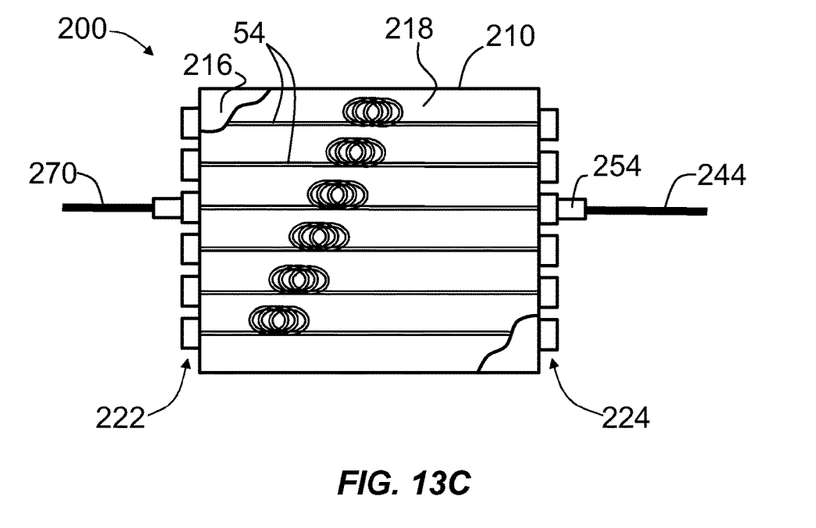

FIG. 13C is similar to FIG. 13B and shows an example compensation module 200 that has a plurality of first connector ports 222 and a plurality of second connector ports 224. First connector ports 222 are optically connected to corresponding second connector ports 224 via compensating optical fibers 54 having different lengths L2. Compensation module 200 thus allows for optical fiber cables 244 and 270 to be optically connected while having select amounts of modal dispersion compensation.

In example embodiment, compensation module includes Universal polarity management or Methods A, B, C polarity management according to the TIA-568-C.0 standard.

The compensation modules shown in FIGS. 13A-13C offer flexibility in selecting a desired amount modal dispersion compensation to achieve optimum system performance. For the BiDi application with center transmission wavelengths of $\lambda_A=850$ nm and $\lambda_B=908$ nm, the desired peak wavelength $\lambda_p$ for the link 40 is about 880 nm. With this optimum peak wavelength, the bandwidths at both $\lambda_A=850$ nm and $\lambda_B=908$ nm are about at the OM4 level, which can increase the data rate for the transmission distance. For a typical OM4 fiber distribution with peak wavelength $\lambda_p$ between 820 nm and 880 nm, the peak wavelength shift is between 0 to 60 nm. The multipart switching module design with different compensation jumpers allows choosing the right amount of compensation to move the peak wavelength close to the target.

Table 2 sets forth example lengths L2 of compensation fiber 54 for a four-fiber compensation module 200. In this embodiment, the compensation fiber 54 has an alpha of $\alpha'=1.55$. This example compensation module 200 is designed to work with a OM4 fiber link up to 150 m.

TABLE 2

| Four-fiber compensation module configuration | | | | |
|---|---|---|---|---|
| Fiber port | 1 | 2 | 3 | 4 |
| L2 (m) | 0 | 2.4 | 4.8 | 7.2 |

Table 3 sets forth example lengths L2 of compensation fiber 54 for an eight-fiber compensation module 200. In this embodiment, the compensation fiber 54 has an alpha of $\alpha'=1.55$. This module is designed to work with a OM4 fiber link of length LR up to 300 m.

TABLE 3

| Eight-fiber compensation module configuration | | | | | | | | |
|---|---|---|---|---|---|---|---|---|
| Fiber port | 1 | 2 | 3 | 4 | 5 | 6 | 7 | 8 |
| L2 (m) | 0 | 2.1 | 4.2 | 6.3 | 8.4 | 10.5 | 12.6 | 14.7 |

The fiber selection is according to the MMF length L1 and it peak wavelength $\lambda_p$. For example, if the link length L1 is 150 m, and the peak wavelength is 850 nm, the required length for compensation fiber $\alpha'=1.55$ is 4.53 m. We can choose port "3" in the four-port compensation module 200 or port "3" in the eight-port compensation module. In another example, if the link length L1 is 230 m, and the peak wavelength is $\lambda_p=830$ nm, the required length L2 for compensation fiber with $\alpha'=1.55$ is L2=9.7 m. We can choose port "6" in the eight-port compensation module 200.

An aspect of the disclosure is a method of performing bi-directional communication of optical signals 24A and 24B over optical fiber cable 30. With reference to FIG. 1, the method includes transceivers 20A and 20B emitting optical signals 24A and 24B that travel over optical fiber cable 30 to the opposite transducer. The optical signals are then detected and processed by the respective transducers 20A and 20B. Filters 25A and 25B serve to block reflected optical signals 24A and 24B respectively so that the emitted and reflected optical signals are not processed by the emitting transducer as a received optical signal. In an example, optical fiber cable 30 has a bandwidth $BW_{40}$>2100 MHz·km for optical signals 24A and 24B and a reach LR that could not meet the minimum bandwidth requirement at wavelengths $\lambda_A$ and $\lambda_B$ with an optical fiber cable having only primary fiber 44.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber cable for bi-directional communication of optical signals, comprising:
    a primary multimode optical fiber having first and second ends separated by a length L1, an alpha parameter α of about 2.1 and a peak wavelength $\lambda_p$ in the range from 820 nm to 880 nm, and a first modal bandwidth $BW_{40}$ of 4 GH·km or greater;
    a compensating multimode optical fiber having first and second ends separated by a length L2<L1 and that is optically coupled to the primary multimode optical fiber at the respective second ends, wherein the compensating multimode optical fiber has an alpha parameter α'<α, and wherein −1.2≤(α'−α)≤−0.1;
    a first optical fiber connector operably arranged at the first end of the primary multimode optical fiber;
    a second optical fiber connector operably arranged at the first end of the compensating multimode optical fiber; and
    wherein the optical fiber cable has a reach 50 m<LR<800 m; and
    wherein the compensating multimode optical fiber has:
        a) a bandwidth $BW_2$ of less than 500 MHz·km at nominally 850 nm;
        c) a peak wavelength $\lambda'_p$>880 nm; and
        b) a maximum relative refractive index $\Delta_0$ and wherein 0.7%≤$\Delta_o$≤3.0%.

2. The optical fiber cable according to claim 1, wherein the compensating multimode optical fiber has a peak wavelength $\lambda'_p$>880 nm.

3. The optical fiber cable according to claim 1, wherein at least one of the primary multimode optical fiber and the compensating multimode optical fiber is bend-insensitive.

4. The optical fiber cable according to claim 1, wherein LR is about 150 m.

5. The optical fiber cable according to claim 1, wherein the optical fiber cable is configured as either an LC jumper cable or as an MPO-to-LC fan-out cable.

6. The optical fiber cable according to claim 1, wherein L2<(0.2)·L1.

7. The optical fiber cable according to claim 6, wherein L2<(0.1)·L1.

8. A bi-directional optical fiber communication system, comprising:
    the optical fiber cable according to claim 1;
    a first transceiver having a first port that is operably connected to the first optical fiber connector of the optical fiber cable;
    a second transceiver having a second port that is operably connected to the second optical fiber connector of the optical fiber cable; and
    wherein the first transceiver emits optical signals of a first wavelength 4 that travel to the second transceiver, and wherein the second transceiver emits optical signals of a second wavelength $\lambda_B \neq \lambda_A$ that travel to the first transceiver.

9. The bi-directional optical fiber communication system according to claim 8, wherein 820 nm≤$\lambda_A$≤880 nm and 880 nm≤$\lambda_B$≤1600 nm.

10. The bi-directional optical fiber communication system according to claim 8, wherein 100 m<LR≤150 m.

11. The bi-directional optical fiber communication system according to claim 8, wherein the optical fiber cable supports transmission of optical signals at a data rate of 10 Gb/s or greater.

12. The bi-directional optical fiber communication system according to claim 11, wherein the optical fiber cable supports transmission of optical signals at a data rate of 16 Gb/s or greater.

13. The bi-directional optical fiber communication system according to claim 12, wherein the optical fiber cable supports transmission of optical signals at a data rate of 25 Gb/s or greater.

14. The bi-directional optical fiber communication system according to claim 8, wherein the first and second transceivers include respective first and second vertical-cavity surface-emitting lasers (VCSELs).

* * * * *